Feb. 17, 1959 S. DUINKER 2,874,370

DEVICE FOR RECORDING AND RE-TRANSMITTING CODED INFORMATION

Filed April 19, 1954 5 Sheets-Sheet 1

INVENTOR
SIMON DUINKER

BY Fred M Vogel
AGENT

INVENTOR
SIMON DUINKER

BY Fred M Vogel
AGENT

Feb. 17, 1959 S. DUINKER 2,874,370
DEVICE FOR RECORDING AND RE-TRANSMITTING CODED INFORMATION
Filed April 19, 1954
5 Sheets-Sheet 3

INVENTOR
SIMON DUINKER
BY Fred M Vogel
AGENT

INVENTOR
SIMON DUINKER
BY Fred M Vogel
AGENT

INVENTOR
SIMON DUINKER

BY Fred M Vogel

AGENT

United States Patent Office 2,874,370

Patented Feb. 17, 1959

2,874,370

DEVICE FOR RECORDING AND RE-TRANSMITTING CODED INFORMATION

Simon Duinker, Eindhoven, Netherlands, assignor, by mesne assignments, to North American Philips Company, Inc., New York, N. Y., a corporation of Delaware

Application April 19, 1954, Serial No. 424,179

Claims priority, application Netherlands May 5, 1953

8 Claims. (Cl. 340—174)

Figure 1:
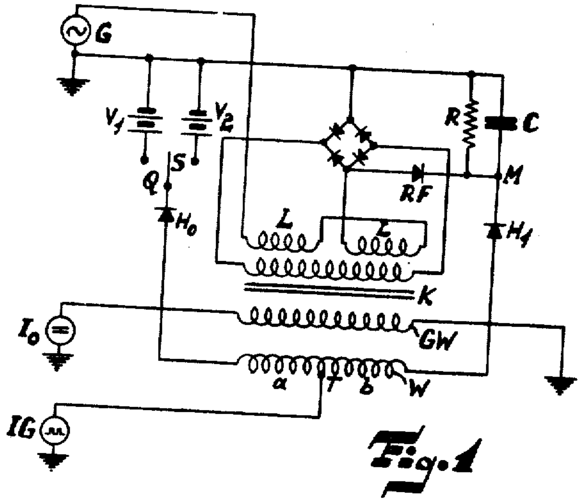

This invention relates to devices for recording and re-transmitting coded information, which comprise a trigger circuit having two stable electric conditions and a comparison circuit, which trigger circuit with a given recorded information is in a condition which is determined by said information and which condition is compared with at least one other electric condition by means of the comparison circuit, and in which under the action of an electrical impulse supplied to the comparison circuit a control voltage is produced in said comparison circuit, the value and the direction of said control voltage being determined by the difference of the two compared conditions. Said control factor is employed to control the trigger circuit.

The present invention has for its object to provide a device, in which the trigger circuit is controlled in a simple manner in accordance with the nature of the two conditions to be compared and has the feature that the comparison circuit is an impedance which is connected through elements which are conductive in one direction, to the two comparison points and the pulse is supplied to a tapping of the impedance with the result that the control voltage builds up across the impedance and, if the value exceeds a particular value in a given direction, causes the trigger circuit to pass over from its initial condition to its other stable condition.

The invention is more particularly intended for use in electrical shift registers in which, in a number of cascade-connected trigger circuits, a trigger circuit of the cascade receives information under the action of pulses supplied to comparison circuits, said information corresponding to that of a preceding or a succeeding trigger circuit of the cascade. To this end, according to a further feature of the invention, a comparison circuit of the aforesaid type is included in a cascade of at least two trigger circuits between every two successive trigger circuits of the cascade.

More particularly trigger circuits of the magnetic or dielectric type are suitable for use in the device according to the invention. A cascade of trigger circuits made up by means of electron-discharge tubes, which may or may not be gas-filled, is rather fragile in view of the large number of electron discharge tubes required, which often requires replacement of a tube. Moreover, the heat evolved by such cascades is considerable.

Therefore it has been proposed to record on drums covered with a continuous medium of magnetic material, in which the information is recorded under the action of magnetic forces. In order to regain the recorded information mechanical motion is necessary to form voltages across a recording coil. It will be appreciated that by said mechanical motion the serviceability of such recording drums is greatly limited. In order to avoid said mechanical motion such devices have been made up of static magnetic trigger circuits, in which the electric stable conditions are created by the positive and negative remanent magnetism of the magnetic cores of the trigger circuits. However such devices suffer from the disadvantage that a given number of information elements requires double the number of trigger circuits, each half of which is controlled by independent electrical pulses which do not coincide with regard to the time. Moreover, the reading of the information without blanking it out involves serious difficulties.

According to a further feature of the invention said disadvantages are obviated by using trigger circuits of the dynamic magnetic or dielectric type comprising a variable reactance with a medium which exhibits a non-linear part of its polarisation characteristic, to which reactance a supply oscillation is fed. The effective value of the oscillation produced across the reactance under the action of the supply oscillation is brought to a comparatively high value by preferably pulsatory signal voltages of a given polarity sign, which are also supplied to the variable reactance, and it is brought to a comparatively low value by signal oscillations of the opposite polarity sign. The impedance of the comparison circuit across which the control value is built up, if the trigger circuit is of the magnetic dynamic type and the variable reactance comprises one or more coils with ferromagnetic cores of which the polarisation characteristic is non-linear, is a winding provided on one or more of the aforesaid ferromagnetic cores, and if the trigger circuit is of the dynamic dielectric type and the variable reactance comprises one or more capacitors with a dielectric having a non-linear polarisation characteristic, this impedance is a resistor connected in series with each of the capacitors.

Said disadvantages are, however, also avoided by using devices in which the trigger circuits are of the transistor type. Therefore, according to a further feature of the invention, the trigger circuits are of the transistor type with suitable impedances which comprise at least one capacitor and are connected between the electrodes of the transistor such that, dependent upon the polarity sign of preferably pulsatory signal oscillations supplied to any of the input electrodes, the circuit-arrangement has two stable conditions, one with a comparatively high electrode voltage and the other with a comparatively low electrode voltage, the impedance of the comparison circuit across which the control factor is built up being the primary winding of a transformer whose secondary winding is connected through a delay network to said input electrode.

Figure 2:
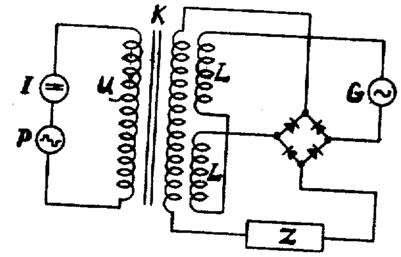
Figure 3:
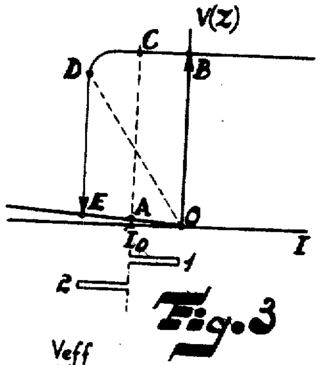
Figure 12:
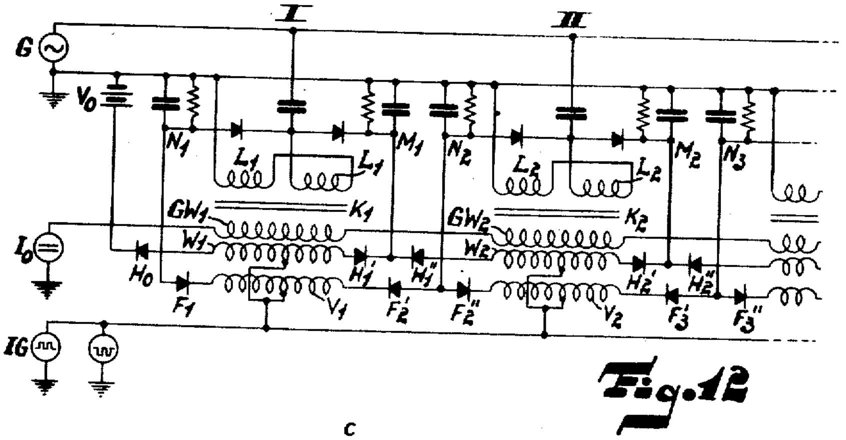
Figure 14:
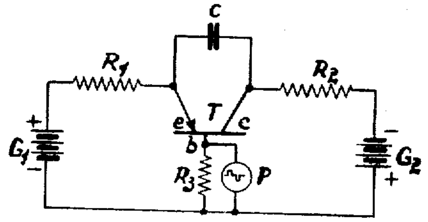
Figure 15:
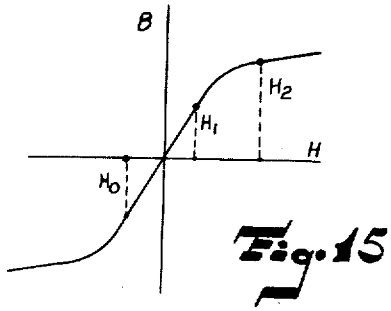
Figure 13:
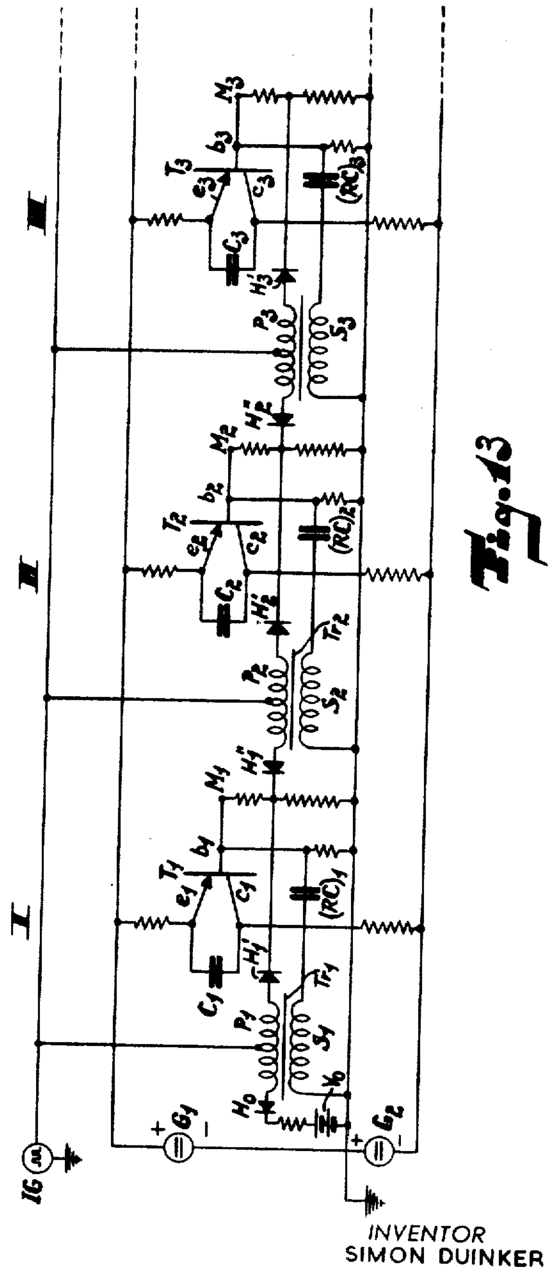

In order that the invention may be readily carried into effect, it will now be described in greater detail with reference to the accompanying drawings, given by way of example, in which Fig. 1 shows a circuit-arrangement according to the invention, comprising a trigger circuit of the magnetic dynamic type, Fig. 2 shows the trigger circuit for use in the arrangement shown in Fig. 1, Fig. 3 a characteristic curve of such a circuit, Fig. 4 a shift register made up of arrangements according to the invention, Fig. 5 a trigger circuit for use in the arrangement shown in Fig. 4, Fig. 6 a characteristic curve of such a circuit, Fig. 7 a modification of the register shown in Fig. 4, Fig. 8 a shift register adapted to displace its electrical contents in one direction or in the other, Fig. 9 a shift register comprising trigger circuits of the dielectric dynamic type, Fig. 10 the trigger circuit for use in the register shown in Fig. 9, Fig. 11 a trigger circuit adapted inter alia to control the inertia of the transitions from one stable condition to the other, Fig. 12 a modification of the register shown in Fig. 8, Fig. 13 a shift register comprising trigger circuits of the transistor type, Fig. 14 the trigger circuit for use in the register shown in Fig. 13, and Fig. 15 is a representative hysteresis curve for the cores in the magnetic trigger circuits used for carrying out the invention.

Fig. 1 shows an arrangement in accordance with the invention comprising a trigger circuit of the dynamic magnetic type whereof the two stable electric conditions are brought about by returning the oscillation set up across the variable reactance, which is consequently of an inductive nature in the case under review, to the variable inductance after rectification. For the sake of clarity such a trigger circuit, which is known per se, is separately shown in Fig. 2. The diagrammatically represented core K, which is made from ferromagnetic material whereof the polarisation curve, that is to say the curve indicating the relationship existing between the magnetic induction B and the magnetic field strength H, is non-linear, together with windings L constitutes the variable reactance. The oscillation set up across L and produced under the action of the supply oscillator G is returned to the core K by way of the Graetz circuit. Considering the direct voltage across the impedance Z as a function of the direct current I, which is made active in the core K by means of the windings U, said functional relationship, with a sufficient feedback, is found to be as represented by the curve shown in Fig. 3 whereof the part shown in broken lines indicates unstable conditions. When setting the direct current I to a value $I_0$ and the circuit is in the condition indicated by point A, a current impulse from the source P and denoted by 1 in Fig. 3 will cause the circuit to pass over to the condition indicated by point C and this via points O and B of the curve, the transition from O to B being discontinuous. Upon a next impulse of the opposite sign denoted by 2 in Fig. 3, the circuit resumes the condition characterized by point A, but now via points D and E, the transition from D to E being discontinuous. As an alternative, the pre-magnetization produced by $I_0$ may naturally be produced by a permanent magnet. The circuit-arrangement shown in Fig. 2 is shown in a balanced form which, in general, is desirable but not necessary.

Fig. 1 shows an arrangement according to the invention, which comprises said trigger-circuit and in which the pre-polarisation is made effective in the core K by the winding GW carrying the current $I_0$. The circuit RF, R, C converts the oscillation across winding L, which is produced by the oscillator G, into a direct voltage. According as to whether the trigger circuit is in the condition A or C (Fig. 3) a low or a high direct voltage relative to earth is set up at point M. The voltage of the source of direct voltage $V_1$ corresponds to the voltage set up at M if the trigger circuit is in the condition C and the voltage of the source of direct voltage $V_2$ corresponds to the voltage at M if the trigger circuit is in the condition A. Dependent upon the position of switch S the point Q will have a high or low direct voltage relative to earth. The comparison circuit comprises the elements $H_0$, $H_1$ and W whereof $H_0$ and $H_1$ represent elements which are conductive in one direction and W is the impedance, that is to say a coil provided on the core K. The tapping point T on the winding W is connected to the pulse producer IG. If the impedance consisting of the internal resistance of the direct voltage sources $V_1$, $V_2$ and the impedance of the rectifier $H_0$ corresponds to the impedance constituted by the R-C circuit and $H_1$ the tapping point T will preferably be chosen as the centre tap on W.

Let the switch S be connected to $V_1$, so that point Q has a potential corresponding to the condition C of the trigger circuit, and the trigger circuit be in the condition A. In the absence of a pulse, the tapping T on the winding B has earth potential, so that both in the case of points Q and M having a high and a low positive potential relative to earth the rectifiers $H_0$ and $H_1$ are not conductive. The maximum voltage of a pulse supplied by the pulse producer IG is so chosen as to lie between the voltages of $V_1$ and $V_2$, that is to say between the voltages associated with the two conditions of the trigger circuit. In the example chosen only the rectifier $H_1$ will thus be made conductive. Hence, only the winding half *b* of W is traversed by a current from IG via said winding half, $H_1$ and the R-C circuit to earth. The winding sense of the winding W is so chosen that such a pulse has the same direction, relative to the curve of the circuit-arrangements, as the pulse 1 shown in Fig. 3. The trigger circuit consequently passes from condition A to condition C, in other words the voltage at point M becomes substantially equal to that of $V_1$. In this case a next pulse produced at the tapping T on W cannot make conductive either of the rectifiers $H_0$ and $H_1$, since both point Q and point M have a higher potential than the pulse itself relative to earth. Consequently, no control current occurs in the winding W, that is to say the trigger circuit maintains the condition C. When changing over the switch S from $V_1$ to $V_2$ so that point Q has a potential corresponding to a condition A of the trigger circuit, a pulse from IG makes $H_0$ conductive. Hence, a current can only flow from IG via the winding half *a* of the winding W, $H_0$ and $V_2$ to earth. With the winding sense chosen, said pulse causes the trigger circuit to pass from condition C to condition A, in other words the voltage at point M becames substantially equal to that of $V_2$. Both point Q and point M now have a potential relative to earth corresponding to the condition A shown in Fig. 3. A pulse from IG makes both rectifiers $H_0$ and $H_1$ conductive and current tends to flow from IG both via the winding half *a* of W, $H_0$ and $V_2$ and via the winding half *b* of W, $H_1$ and the R-C circuit. However, the direction of the current through the winding half *a* is opposite to that of the current through the winding half *b* and by making provision that the resultant number of ampere turns produces a control factor smaller than a pulse 1 or 2 shown in Fig. 3, the trigger circuit maintains its initial condition. If the impedance of $V_2$ and $H_0$ is equal to the impedance of $H_1$ and the R-C circuit, and T is a centre tap on W, the resultant number of ampere turns is exactly zero due to cancellation of the induced magnetic fields in *a* and *b*, and therefore the control voltage is zero.

It is assumed that the voltages of $V_1$ and $V_2$ be equal to the voltages set up at M in both conditions of the trigger circuit. The sole condition imposed on $V_1$ and $V_2$ is, however, that if the circuit is to be changed over from one condition to the other the control factor produced should at least be equal to the pulse minimally required to effect a change over, such as the pulses 1 and 2 shown in Fig. 3. If no change-over is wanted the control factor must be smaller than said pulse.

Detailed operation of the magnetic trigger circuits of Figs. 1, 2, etc., will now be described with reference to the representative hysteresis curve shown in Fig. 15. The D.-C. polarizing current in winding GW would set the working point at $H_0$; however, the current supplied by the rectifier bridge circuit through the winding RW causes the working point to be brought to $H_1$ in the case of the relatively low value of oscillation described above and indicated at point A in Fig. 3, and causes the working point to be brought to $H_2$ in the case of the relatively high value of oscillation described above and indicated at point C in Fig. 3. The slope of the curve at point $H_1$ is such as to cause a relatively low value of oscillation voltage and hence a relatively low value of rectified voltage, so that this is a first point of stable operation. The slope of the curve at point $H_2$ is such as to cause a relatively high value of oscillation voltage and hence a relatively high value of rectified voltage, so that this is a second point of stable operation. The operation of the trigger circuit can be changed from one stable condition to the other, or vice versa, by applying a suitable pulse to the winding W from the pulse producer IG. In the circuits of Figs. 2 and 5, the winding U is the equivalent of the combined windings W and GW.

Fig. 4 shows a shift register made up of arrangements according to the invention. Instead of using the trigger circuit described with reference to Fig. 2, trigger circuits are now used wherein the variable reactance is coupled to a reactance of opposite sign, and whereof the operation, for the magnetic type, will be explained with reference to Fig. 5. In this figure, K represents a ferromagnetic core whereof the polarisation characteristic is non-linear. L and U are windings provided on said core, C is a capacitor either linear or non-linear, G is a supply oscillator and R is a resistor in which, moreover, incidental losses of the circuit are imagined to occur, for example the resistance of the supply oscillator G and of coil L. If, for example, the effective value $V_{eff}$ or the peak value of the alternating voltage across any of the elements L, C, R, or I, which voltage is produced under the action of a supply voltage E with a frequency $f$, is regarded as a function of the polarisation, which polarisation is made operative by means of a direct current I passing through U, the relationship between said values is found to be as shown in Fig. 6, provided particular conditions are fulfilled with respect to E, C, $f$ and R, to which reference is made in prior patent application, U. S. Serial No. 369,793, filed July 23, 1953. If the polarisation is set $I=I_0$ as shown in Fig. 6 the valve of $V_{eff}$ is either $V_2$ (condition C) or $V_3$ (condition A). Assuming this value to be $V_2$ a current pulse in the winding U amounting to $\Delta I_1$ or more and of the same sign as $I_0$, will cause $V_{eff}$ to pass from $V_2$ to $V_3$. Any next similar pulse will not change the condition, hence $V_{eff}$ will retain the value $V_3$ at least approximately. On the appearance of a pulse in excess of or equal to $\Delta I_2$ and of a sign opposite to $I_0$, it will however cause $V_{eff}$ to pass from $V_3$ to $V_2$. In this case also a further similar pulse will not cause $V_{eff}$ to pass from $V_2$ to $V_3$. The output signal of the trigger circuit shown in Fig. 5, that is to say an alternating voltage having a large or small amplitude according as to whether the circuit is in one stable condition or in the other, can fundamentally be taken not only from any of the elements L, U, C or R, but also from windings magnetically connected in parallel with L or U, that is to say from windings provided on the core in such a manner that the turns of said windings comprise the same flux as the turns of L or U. Fig. 4 shows a shift register made up of said trigger circuits, the pre-set polarisation being caused to act in the cores K by the windings GW carrying the current $I_0$. The circuits RF, R, C convert the oscillations through the windings L, which are produced by the common oscillator G, into direct voltages. According as to whether the trigger circuit concerned is in the condition A or C (Fig. 6) a low or a high direct voltage relative to earth is set up at the points $M_1$, $M_2$ and so on. Said trigger circuits may comprise information in the form of a binary code, for example a high voltage condition at a point M may correspond to unity and a low voltage condition at a point M may correspond to zero. This information may, for example, be supplied to the device through the windings RW. Dependent upon the direction of the current pulse passing through the windings concerned, the associated trigger circuit assumes the condition A or C. The points $M_1$, $M_2$, $M_3$ are connected via rectifiers $H_1'$, $H_1''$, $H_2'$, $H_2''$ and so on to the ends of the windings W. The centre taps on said windings W are all connected to the pulse producer IG. Provisionally it will be assumed that the winding W of the first trigger circuit of the cascade at the end not connected to point $M_1$ is connected to earth via a rectifier $H_0$ and a direct voltage battery $V_0$. This battery $V_0$ has a terminal voltage corresponding, for example, to the voltage set up across $M_1$, $M_2$ or $M_3$ when the associated trigger circuit is in the condition A, hence, according to the aforesaid assumption, corresponding to an information element zero.

If a pulse is delivered by the pulse producer IG to all centre taps on the windings W, and more particularly a positive pulse relative to earth in said condition of the rectifiers, of which pulse the maximum voltage is lower than the voltage set up across point M when the associated trigger circuit is in the condition C, but higher than the voltage set up across said point when the associated trigger circuit is in the condition A, it can be proofed that the information of the register has moved up one step in the register after delivery of the pulse, that is to say if the contents of the trigger circuit I are, say, 1, those of II are also 1 and that of III are zero, then, after delivery of the pulse, the contents of II are 1, those of III are 1 and those of the trigger circuit IV (not shown) are zero. In conjunction with the choice of $V_0$, the contents of I are zero. A next pulse results in that the contents of the trigger circuits are as follows: those of I are zero, those of II are also zero, those of III are 1, those of IV are 1 and those of the trigger circuit V (not shown) are zero.

Assuming III to be the last trigger circuit of the cascade, the output signal of the register can be taken from $M_3$, in the present case 0, 1, 1, 0, 0, 0, 0. . . . In this instance the contents of the last trigger circuit are transmitted, but it will be appreciated that an output signal can also be read off on any of the other trigger circuits.

This may be explained by considering again the example chosen, hence I:1, II:1, III:0, that is to say that $M_1$ has a high potential relative to earth, corresponding to the condition C of I, $M_2$ also being at a high potential but $M_3$ being at a low potential relative to earth. The voltage across $V_0$ corresponds to the condition A of the trigger circuits, that is to say has a low voltage relative to earth. In the absence of a pulse, the centre taps on the winding W have earth potential, so that the rectifiers H are not conductive both in the case of the points M being at a high positive potential and at a low positive potential relative to earth. The pulse set up across the centre tap on $W_1$ is now able, owing to the choice of its maximum voltage, to make only the rectifier $H_0$ conductive. Consequently, only the winding half $a$ of $W_1$ is traversed by a current from IG via said winding half, $H_0$ and $V_0$ to earth. The winding sense of the windings W has again been so chosen that such a pulse has the same direction as the pulse $\Delta I_1$ shown in Fig. 3 with respect to the characteristic curve of the circuit arrangements. Hence, the circuit I passes from the condition C to the condition A, that is to say its content becomes zero, in other words it takes over the content of $V_0$. The pulse appearing at the centre tap on $W_2$ is however unable to make either of the rectifiers $H_1'$ and $H_2'$ conductive, since both points $M_1$ and $M_2$ have a higher voltage than the pulse itself relative to earth. Consequently no switch pulse appears in the winding $W_2$, that is to say the circuit II retains the contents 1, in other words it takes over the contents of I which is also 1. Finally, the pulse across the centre tap on $W_3$ can only make conductive the rectifier $H_3'$, so that a current will flow only from IG via the winding half $b$ of the winding $W_3$, $H_3'$ and the $R_3$—$C_3$ circuit to earth. This pulse causes the circuit to pass from the condition A to the condition C so that the contents of III change from 0 to 1, in other words III takes over the contents of II. The contents of the register then are as follows: I:0, II:1, III:1. A next pulse of IG similarly moves up said contents one step. Here a case occurs, which has not been discussed so far, to wit a pulse across the centre top on a winding W makes both rectifiers conductive and this at I where $M_1$, like $V_0$, has a voltage commensurate with the condition A illustrated in Fig. 6. Current now tends to pass from IG both via the winding half $a$ of $W_1$, $H_0$ and $V_0$ and via the winding half $b$ of $W_1$, $H_1'$ and the $R_1$—$C_1$ circuit to earth. As demonstrated, no pulse occurs in this case, at least not a pulse having a sufficient value, that is to say I retains the contents 0 and consequently takes over again, as it were, the contents of $V_0$ to wit zero.

In the foregoing, the recording is effected by whether or not simultaneous energisation occurs in the windings RW. This may, however, also be effected in a manner as will be set out with reference to Fig. 1, the trigger circuit and its associated comparison circuit shown therein being regarded as the first of a cascade of such arrangements. The voltage of the direct voltage source $V_1$ corresponds to the voltage at a point M if the associated trigger circuit is in the condition C, hence to contents 1, whilst the voltage of the direct voltage source $V_2$ corresponds to contents zero. Dependent upon the condition of switch S the trigger circuit L will take the contents 1 or zero upon the occurrence of a pulse from IG. Upon a next pulse, I takes over the contents determined by S and moreover, II takes over the contents of I. In this manner the register is able to take given information. The combination $V_1$, $V_2$, S may naturally be replaced by any other circuit adapted to set up or take potentials corresponding to contents 1 and zero between point Q and earth.

If after recording information the switch S shown in Fig. 4 is in the condition shown in broken lines, the contents of III is again transferred to I on the occurrence of a pulse from IG; this switching method is employed for many different purposes.

Figure 6:
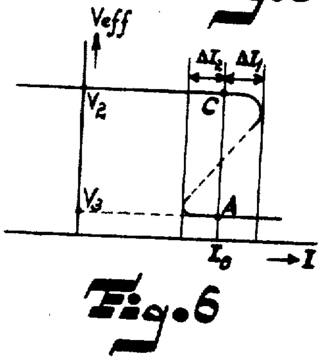
Figures 6, 7:
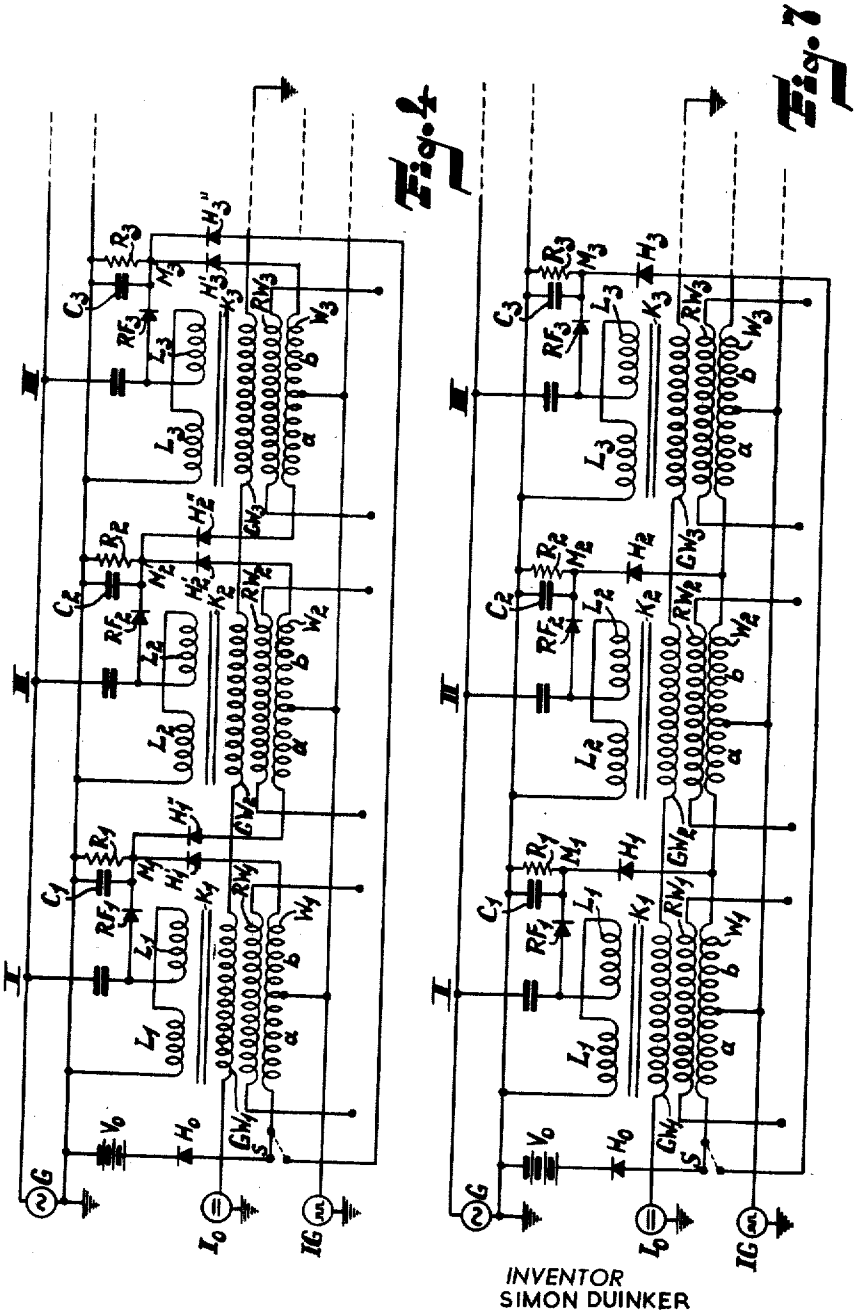

Fig. 7 shows a shift register resembling that shown in Fig. 4. Two rectifiers H' and H'' have however been replaced by a common rectifier H. It will be evident that this can be effected without affecting its operation. Sometimes, however, it is advantageous to refrain from replacement of two rectifiers by one, since voltages whereof the components in the aforesaid balanced form have frequencies that are even harmonics of the supply frequency are set up across the windings W. In the case shown in Fig. 7 the voltages are able to produce currents which may become unduly heavy dependent upon the winding rations of the windings L and W and upon the impedance constituted by the series circuit of the windings W with regard to said currents. Manifestly, however, the use of two rectifiers H' and H'' prevents the occurrence of said currents. On the other hand, said even-harmonic components may be employed to produce the direct voltage indicative of the condition of the trigger circuit.

The circuit-arrangements so far described respond only to pulses from IG with a definite polarity sign. For example, in Fig. 4 and in Fig. 7 said pulses must be positive relative to earth owing to the condition of the rectifiers as shown in said figures. In this case, negative pulses are ineffective and, moreover, in the arrangements described, the contents of a trigger circuit are transferred to the next trigger circuit only in one direction.

Figures 8, 9:
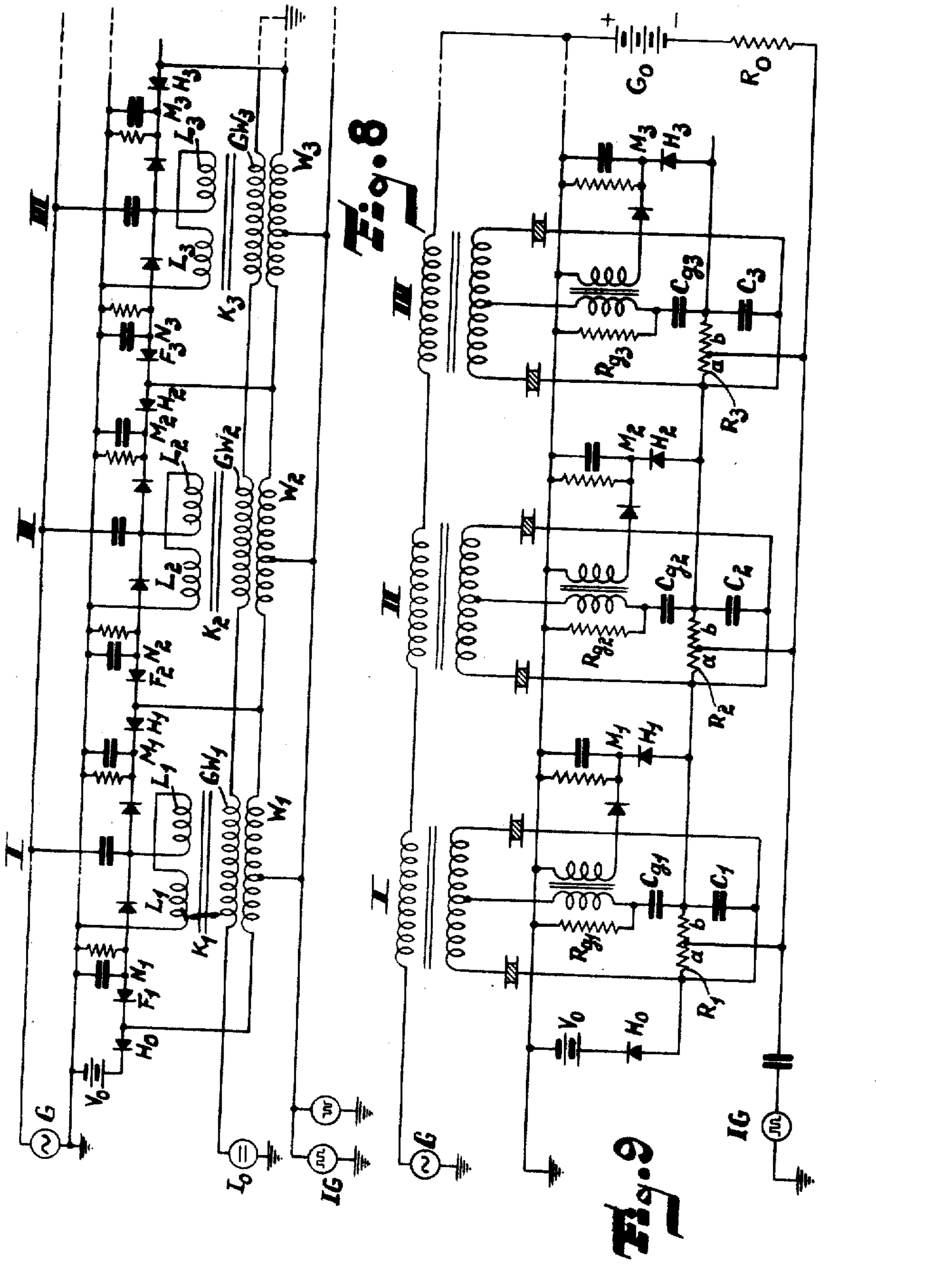

Fig. 8 shows a shift register, in which, dependent upon the signs of the pulse delivered to all trigger circuits, a trigger circuit takes over the contents of the trigger circuit included on the one side in the cascade or from the trigger circuit included on the other side in the cascade.

In the condition of rectifiers shown in Fig. 8, the points M are invariably at a positive potential relative to earth, and the points N are invariably at a negative potential relative to earth. This means that a positive pulse delivered, for example, to the winding W of trigger circuit II is able to produce a control pulse dependent only upon the potentials set up at the points $M_1$ and $M_2$, when the rectifiers $H_1$ or $H_2$ are conductive, that is to say that in the case of positive pulses II takes over the contents of I. A negative pulse, however, is able to bring about a control pulse only dependent upon the potentials set up at points $N_2$ and $N_3$, when current passes through the rectifiers $F_2$ and $F_3$, that is to say that II takes over from III in the case of negative pulses. Thus, the state of any of the stages at a given time is reflected in the values of voltage at the points M and N of the stage. Since an end of each of the windings W of each of the adjacent stages is connected to the voltage points M and N, respectively, of the stage concerned, the state of the stage concerned will determine what state an adjacent stage will assume when a control pulse is supplied to the windings W from the source IG. It will be evident that in those cases, in which the direct series-connection of the windings W entails difficulties in conjunction with undue couplings referred to above, the points N must not be connected, via rectifiers F, to the windings W but to separate windings V, otherwise similar to W (Fig. 12), the rectifiers H and F then each being replaced by two rectifiers H', H'' and F', F'' respectively and, under the conditions chosen, the positive pulses from IG being delivered to the centre taps on the windings W, and the negative pulses to the centre taps on the windings V.

So far the case has been considered in which the arrangement is made up of trigger circuits and the medium, which exhibits a non-linear polarisation characteristic, is of a ferromagnetic nature. Alternatively, however, the medium may be of a dielectric nature. Fig. 9 shows an arrangement in which trigger circuits of the dielectric dynamic type are employed. For the sake of clearness, the trigger circuit used in Fig. 9 is separately represented in Fig. 10, in which M is a dielectric material whereof the polarisation characteristic, that is to say the characteristic indicating the relationship existing between the dielectric shift D and the electric field strength F, is non-linear, $C_1$ and $C_2$ represent corresponding capacitors comprising said material M as a dielectric, $L_1$ and $L_2$ represent corresponding linear or non-linear inductance coils, $S_1$, $S_2$, $S_3$ represent blocking transformers, G represents a supply oscillator, $V_0$ represents a direct voltage source and T represents a source of pulsatory voltages. For example, if the effective value $V_{eff}$ of the alternating voltage across any of the terminal pairs *a—b*, *c—d* or *e—f* is considered as a function of the polarisation, which is made to act by means of a direct voltage V set up across $C_1$ and $C_2$, a relationship is found to exist between $V_{eff}$ and V which is analogous to that existing between $V_{eff}$ and I in the circuit arrangement shown in Fig. 5. A proper choice of the pre-set direct voltage $V_0$ thus permits in the same manner, by voltage pulses of current value and direction, the effective value of the alternating voltage across any of said terminal pairs to be given a high or a low value. It is to be noted that in the balanced arrangement shown in Fig. 10, the voltages set up across the terminal pairs *a—b* and *c—d* comprise only components whereof the frequencies are an odd multiple of the supply frequency, and the voltages across the terminal pair *e—f* comprise only components whereof the frequencies are an even multiple of the supply frequency.

In Fig. 9 the polarising direct voltage $G_0$ is made to act in the individual trigger circuits via the common resistor $R_0$, the branch *b* of resistor R, the capacitor $C_g$ and the resistor $R_g$. The voltage $G_0$ is now set up across the capacitor $C_g$ which consequently plays the role of the voltage source $V_0$ shown in Fig. 10. In the arrangement shown, the resistor $R_0$ should be made high in order that it shall not constitute a short-circuit for the pulse producer IG with respect to earth. This pulse producer IG, which is on the one hand connected via a blocking capacitor to the centre taps on the resistors R is required, with respect to the pulse producers IG of the arrangements described with reference to the preceding figures, to deliver pulses whose maximum voltage has increased by a value $G_0$, since the centre taps on the resistors R are at a potential $-G_0$ relative to earth. Therefore the value of the voltage pulses delivered by IG is again so chosen that if a point M has a low potential relative to earth—which consequently corresponds to contents zero of the trigger circuit associated with said point M in accordance with the example chosen—the associated rectifier H becomes conductive on the occurrence of the pulses and, if the point M has a high potential relative to earth (which consequently corresponds to contents 1) the rectifier H does not become conductive. The current produced in the conductive condition brings about, across the part *a* or *b* of a resistor R traversed by said current, a potential difference which is set up via the associated capacity C, across the capacitors, comprising the dielectric of the trigger circuit concerned. If both parts *a* and *b* of a resistor R are traversed by a current under the action of a pulse, delivered to the centre tap on R, which consequently holds if both rectifiers connected to the resistor R concerned become conductive, the resulting voltage difference across the resistor R is zero. If the direction of the polarising bias is correctly chosen, said voltage pulses bring about the desired transitions of the condition of the trigger circuit.

Figure 5:
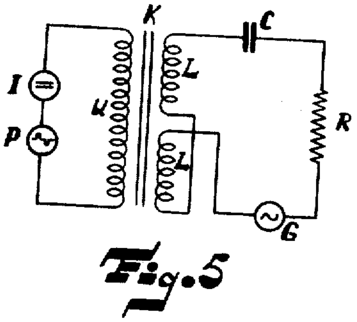
Figure 10:
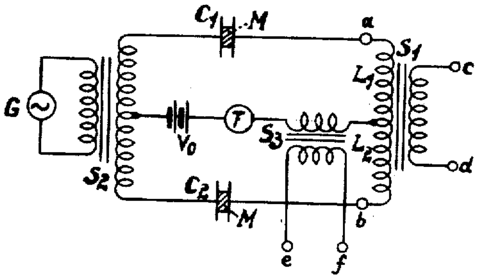

In the trigger circuits comprising a variable reactance coupled to a second reactance of the opposite sign, as shown in Figs. 5 and 10, the polarisation interval $\Delta I_1-\Delta I_2$ and $\Delta V_1+\Delta V_2$ respectively may be increased or decreased at will by including an additional impedance in the circuit connecting the supply oscillator to said reactances. Such a control of $\Delta I_1+\Delta I_2$ and $\Delta V_1+\Delta V_2$ may serve to eliminate the influence of discrepancies of said factors between different trigger circuits. Said factors are alternatively controllable in a different manner, in particular by rectifying the oscillation across any of said reactances or an impedance coupled to the reactance and by feeding back the rectified oscillation to the variable reactance.

Figure 11:
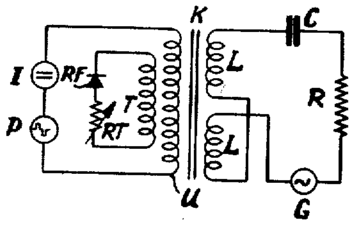

Fig. 11 shows a trigger circuit of the magnetic type in which such a feedback is employed. This circuit, which substantially corresponds to that shown in Fig. 5 and whose corresponding elements bear the same reference numerals, comprises a winding T which is completed through a rectifier cell RF and a resistor RT. The voltage induced across T produces in said circuit a pulsatory direct current which may, if desired be smoothed and whereof the direct current component $I_t$ in the stable condition either equals $\alpha V_2$ or equals $\alpha V_3$ (Fig. 6) and whose direction is determined by RF, $\alpha$ being regulatable by means of RT. It is moreover found that the transition from one stable condition to the other stable condition may be slowed or accelerated according as to whether the polarisation produced by the fed back oscillation has the same direction as the pre-set polarisation or the opposite direction. If said rate of transition is made higher, the recurrence frequency of the pulses delivered by IG may naturally also increase.

The invention is, however, not limited to arrangements in which the trigger circuit is of the magnetic or dielectric type. For example, Fig. 13 shows a shift register in which the trigger circuits comprise transistors. An example of such a trigger circuit is separately shown in Fig. 14. The trigger circuit is of the point contact transistor type, where the transistor T comprises an emitter *e*, a collector *c* and a base *b*. The electrode circuits include suitable resistors $R_1$, $R_2$, $R_3$ and direct voltage sources $G_1$ and $G_2$, and the emitter and collector are interconnected by a capacitor C, with the result that the circuit, as is known, assumes two stable conditions, one having a comparatively high base voltage and the other having a comparatively low base voltage dependent upon the sign of pulses delivered by the pulse source P to the base.

In the arrangements shown in Fig. 13 the comparison circuits comprise two rectifiers and a transformer $T_r$ whereof the primary winding *p* is the impedance across which the control factor is produced and the secondary winding S serves to return the control factor via an R–C network to the base electrode of the associated trigger circuit. In this instance the R–C network serves to delay the pulsatory control factor. In these transistor circuits said delay, albeit small, is beneficial to a satisfactory operation.

Apart from the pulse producer, a shift register comprising transistors does not require alternating voltage sources such as in the case of registers comprising trigger circuits of the magnetic or dielectric type. Hence, demodulation is dispensed with.

What is claimed is:

1. A device for recording and retransmitting coded information, comprising a trigger circuit having an output terminal and having two stable electric conditions thereby to provide at said output terminal a relatively large output voltage when in one of said stable conditions and a relatively small output voltage when in the other of said stable conditions, a source of comparison voltage, a comparison circuit for comparing the voltage at said output terminal with said comparison voltage and comprising an impedance member having a tap thereon, a first unidirectionally-conductive member connected between a first end of said impedance member and said output terminal, a second unidirectionally-conductive member connected between the other end of said impedance member and said source of comparison voltage, and a source of control pulses connected to said tap, whereby for a given value of voltage at said output terminal, as compared to said comparison voltage one of said unilaterally-conductive members will become conductive upon the occurrence of a control pulse from said pulse source, thereby causing a control voltage to be produced in said impedance member, and means connected to apply said control voltage to said trigger circuit to cause said trigger circuit to change from one to the other of said stable states.

2. A device a claimed in claim 1, in which said trigger circuit is of a magnetic dynamic type comprising a ferromagnetic core having a non-linear polarization characteristic, means for polarizing said core, a first coil positioned on said core, a source of supply oscillation connected to said coil, a second coil positioned on said core and having a tap thereby to provide said tapped impedance member, a third coil positioned on said core, and a rectifier circuit connected between said third coil and said output terminal.

3. A device as claimed in claim 1, in which said trigger circuit is of a dielectric dynamic type comprising a pair of capacitors each comprising a dielectric body having a non-linear polarization characteristic, means for polarizing said dielectric bodies, a source of supply oscillations connected to both of said capacitors, and in which said tapped impedance member comprises a resistor connected in series with at least one of said capacitors.

4. A device as claimed in claim 1, in which said trigger circuit is of a transistor type comprising a transistor having three electrodes, a capacitor connected between two of said electrodes, means connecting the remaining one of said electrodes to said output terminal, a transformer having a tapped winding to provide said tapped impedance member and a second winding, and a delay network connected between said second winding and said remaining electrode.

5. A device as claimed in claim 1, in which said control pulses have a value intermediate said relatively large voltage and said relatively small voltage.

6. A device as claimed in claim 1, in which said source of comparison voltage includes means for causing said comparison voltage to be selectively equal to the value of one of said output voltages.

7. A device as claimed in claim 1, in which said source of comparison voltage is a second device as claimed in claim 1, and including means for directly connecting the output terminal of said second device to said second unidirectionally-conductive member of said first-named device.

8. A device as claimed in claim 7, in which the first end of the tapped impedance member of said second device is connected directly to said other end of the tapped impedance of said first-named device, and in which the first unidirectionally-conductive member of said second device and said second unidirectionally-conductive member of said first-named device comprise a single unidirectionally-conductive member connected between the last-named direct connection and the output terminal of said second device.

References Cited in the file of this patent

UNITED STATES PATENTS

| | | |
|---|---|---|
| 2,401,795 | Rady | June 11, 1946 |
| 2,576,026 | Meacham | Nov. 20, 1951 |
| 2,725,517 | Roger | Nov. 29, 1955 |